United States Patent [19]

Lundquist

[11] Patent Number: 5,160,441
[45] Date of Patent: Nov. 3, 1992

[54] METHOD OF CONTINUOUS CENTRIFUGAL REMOVAL OF RESIDUAL LIQUID WASTE FROM RECYCLABLE CONTAINER MATERIAL

[76] Inventor: Lynn C. Lundquist, 10833 NE. Russell, Portland, Oreg. 97220

[21] Appl. No.: 701,778

[22] Filed: May 17, 1991

[51] Int. Cl.⁵ ............................................. B01D 33/15
[52] U.S. Cl. ..................................... 210/781; 134/17; 134/132; 134/133; 210/787; 210/803; 210/374; 494/53
[58] Field of Search ............... 210/781, 787, 803, 217, 210/365, 374, 378, 402; 209/144, 211; 494/53.84; 134/17, 27, 132, 133

[56] References Cited

U.S. PATENT DOCUMENTS

| | | | |
|---|---|---|---|
| 2,878,943 | 3/1959 | Ziherl | 210/374 |
| 3,366,318 | 1/1968 | Steimel | 233/5 |
| 4,122,014 | 10/1978 | Weininger et al. | 210/377 |
| 4,137,176 | 1/1979 | Dudley et al. | 210/375 |
| 4,142,669 | 3/1979 | Burlet | 233/7 |
| 4,186,096 | 1/1980 | Areaux et al. | 210/373 |
| 4,190,194 | 2/1980 | Amero | 494/53 |
| 4,253,960 | 3/1981 | Dudley et al. | 210/373 |
| 4,432,747 | 2/1984 | Posse et al. | 494/9 |
| 4,509,942 | 4/1985 | Gunnewig | 494/53 |
| 4,541,929 | 9/1985 | Janusch | 210/365 |
| 5,080,721 | 2/1990 | Flanigan et al. | 210/781 |

Primary Examiner—Robert A. Dawson
Assistant Examiner—David Reifsnyder

[57] ABSTRACT

The present invention is a method for using a horizontal, continuous process auger centrifuge to separate the granulated material of a container from whatever liquid residue remains within the container. Though this technology is suitable for many diverse applications, a primary objective is the continuous separation of the recyclable plastic of a motor oil container from the remaining reusable motor oil within the container after the container has ostensibly been emptied. It is an objective of the method to accomplish this separation in an economically advantageous manner which uses neither a solvent nor a wash process, and which reclaims the oil in a suitable state for reprocessing. In a second method, a rinsing mechanism is employed by which a residual liquid waste, such as soap, may be concentrated and separated in a first rinse stage without introducing the residual liquid waste in dilute form into the waste water treatment process.

12 Claims, 2 Drawing Sheets

METHOD OF CONTINUOUS CENTRIFUGAL REMOVAL OF RESIDUAL LIQUID WASTE FROM RECYCLABLE CONTAINER MATERIAL

BACKGROUND—FIELD OF THE INVENTION

This invention provides a method for centrifugally separating residual oil or other liquid waste contamination from granulated containers used to package the oil or liquid. In principle, the apparatus described herein consists of a horizontal centrifugal device which separates the oil from the container material in a continuous process. The centrifuge comprises a material auger contained within a perforated cylinder; the auger and perforated cylinder rotate as an assembly at sufficiently high angular velocity that the radial force acting against the liquid contaminant causes the liquid contaminant to flow from the granulated material. The separated liquid is slung into a liquid waste containment housing, while the granulated container material is continuously discharged from the auger.

With an understanding of the present need to protect both the natural environment and to optimize the use of natural resources, the importance of this apparatus and the ensuing method should be readily apparent. In a first case, a mechanical separation of the residual liquid (most notably, motor oil) from its granulated container assures fewer pollutants introduced into the waste water stream in the form of water and oil emulsions. In a second case, a mechanical separation assures a greater return of product into its highest value usage with the least energy expended; that is, motor oil may be recovered in the form of pure motor oil rather than as an emulsion which requires expensive reprocessing for commercial reuse.

BACKGROUND—DESCRIPTION OF THE PRIOR ART

The technology of centrifugally separating residual liquid which was packaged within a container from the actual container material subsequent to granulating or comminution of the container has not heretofore been addressed in any patent available at the time of this application. This is particularly true of plastic containers in the form of blow molded bottles which have contained motor oils or similar non-water soluble liquids.

In partial answer to the above stated absence of technology, a recent application for a batch process apparatus entitled CENTRIFUGE APPARATUS FOR RESIDUAL LIQUID WASTE REMOVAL FROM RECYCLABLE CONTAINER MATERIAL, Ser. No. 07/677,307 has been submitted. As will be seen in the body of this document, the present invention differs substantially from the previously mentioned application.

A new body of technology is growing for the purpose of reclaiming such plastic and other container materials. In most cases, however, the technology has used mechanical agitation in conjunction with washing and soaking baths to remove the contaminant from the granulated container.

Centrifugal separation of a residual liquid contaminant of a container and the actual granulated material from the container as a continuous process is a novel innovation as suggested in this invention.

However, note must be taken of an older technology which uses centrifugal mechanical separation of cutting fluids and oils from metal chips, borings, and the like as encountered in machine shop operations. In this regard, the patents of Dudley et al. (U.S. Pat. Nos. 4,137,176 and 4,253,960), Areaux et al. (U.S. Pat. No. 4,186,096), Weininger et al. (U.S. Pat. No. 4,122,014), Steimel (U.S. Pat. No. 3,366,318), and Ziherl (U.S. Pat. No. 2,878,943) deserve attention. (Note that the two patents of Dudley and the patent of Areaux are refinements of the same practice).

In reviewing the prior art, it is apparent that Dudley and Areaux (U.S. Pat. Nos. 4,137,176, 4,253,960, and 4,186,096) have devised a technology which is continuous. However, the prior art as represented in Dudley and Areaux propels the contaminant laden material by means of the same centrifugal force as is used to remove the contaminant liquid. Further, this prior art moves the contaminated material through the process in a vertical plane, whereas the present invention controls the rate of travel through the apparatus independently of the centrifugal action. Furthermore, the present invention moves the material in a horizontal plane.

Ziherl (U.S. Pat. No. 2,878,943) is similar to Dudley and Areaux in that his process is continuous and vertical. Furthermore, Ziherl controls the rate of material movement through the process. Nonetheless, as will be later seen in regard to this invention, the separation of the liquid waste contaminant is achieved by the centrifugal action within a cone rather than causing the liquid to pass through a sieve.

Ziherl (U.S. Pat. No. 2,878,943) and Burlet (U.S. Pat. No. 4,142,669) teach a controlled material movement through the process by the use of an auger turning at a rotational speed substantially similar to that of the containment housing. Thus, it will not be the intent of this invention to claim controlled material movement as a unique innovation of this invention other than as it relates to the intended use of separating the liquid waste contaminant from the granulated material of the container in which it was packaged. It is important to note, however, that neither Ziherl nor Burlet teach a sieve action for the liquid removal as does this invention.

OBJECTIVES OF THE INVENTION

This invention was developed with an understanding of the limitations of the present methodology used to dispose of, or reclaim containers with residual liquid waste (most notably, plastic oil-filled containers). Furthermore, it was designed with a number of other objectives considering its potential application.

1. It is the general objective of this invention to provide a means of mechanically separating residual liquid waste (such as motor oil) contamination from a granulated plastic container.

2. Another objective of this invention is to remove the residual liquid waste (motor oil) without creating an emulsion by the addition of water or other chemicals.

3. Another objective of this invention is to salvage the residual liquid waste (motor oil) in a usable form for further use without significant product down-grading.

4. Another objective of this invention is to separate the residual liquid waste (motor oil) or other contaminant from the plastic product without introducing that contaminant into the waste water stream.

5. Another objective of this invention is to provide an apparatus which will concentrate the solvent bath in such a manner that the concentrated solution can be removed prior to its entrance into the industrial waste water stream.

6. Another objective of this invention is to provide an apparatus which can be utilized in a continuous operation with sufficient capacity for use in a plastic reprocessing plant to separate residual liquid waste (motor oil or other liquid contaminants) from the plastic to be reprocessed.

7. Another objective of this invention is to provide an apparatus which has the capability of selectively being used as a single stage or multi-stage residual liquid waste separation device.

8. A final objective of this invention is to utilize the technology of two previous patent applications to this oil separation methodology. That is, the application entitled CUTTER ENHANCEMENT FOR PLASTIC SIZE REDUCTION EQUIPMENT, Ser. No. 07/595,258, and the application entitled SECONDARY CUTTER APPARATUS FOR PLASTIC SIZE REDUCTION EQUIPMENT, Ser. No. 07/667677.

These and other objectives and advantages of the present invention, and the manner in which they are achieved, will become apparent in the following specifications and claims.

SUMMARY OF THE INVENTION

In its preferred embodiment, the present invention is a horizontal centrifuge device having the purpose of separating chips or shreds (referred to as granulate) of containers from whatever liquid residue remains within these containers. Though this technology is suitable to many diverse applications, one of its primary functions is the separation of the recyclable plastic contained in a motor oil container from the residual reusable motor oil within the container after the container has ostensibly been emptied. It is an objective to accomplish this in an economically advantageous manner which uses neither a solvent nor a wash process, and which reclaims the oil in a form suitable for reprocessing.

In its preferred embodiment, the present invention may be utilized in plastic reclaiming plants where large quantities of a given plastic container are being centrally processed. Granulation of the container may take place in a location either adjacent to, or distant from the centrifugal unit in this latter application. In this case, not only does the device keep the separated liquid from the waste water treatment stream, it also separates it while it is still in a form usable within oil recovery processing plants.

This invention operates as a continuous process apparatus. In the preferred embodiment, a source of container granulates from an appropriate cutter head is fed into the receiving hopper from whence it is conveyed by auger into the central, feed section of the conveying auger. The conveying auger and its perforated cylinder housing rotate at sufficiently high angular velocity to sling the residual liquid waste contaminant from the granulated material. The liquid waste contaminant is thrown against the perforated cylinder housing and exits through the individual bleed holes of the cylinder. The relative rotational speed of the perforated cylinder housing and the centrifuge auger contained within, is such that the material is conveyed through the apparatus at a controlled rate of forward motion.

In yet another application, a solvent (most notably water) may be injected into the material during high speed operation. In so doing, the contaminant is removed from the granulate material while it is still highly concentrated. In this manner, the centrifugal process of this invention alleviates the need of reclaiming the soluble and solid materials from large volumes of waste water such as are encountered with a typical wash process. Plastic detergent bottles and the like are examples of plastic container materials which are encountered in this latter process. Initial removal of residual soap is done centrifugally in order to remove the soap in high concentration levels prior to subsequent washing processes which put the remainder of the soap into the waste water stream at a low level of concentration.

In yet another embodiment of this invention, a multi-stage solvent injection means is provided wherein a multiplicity of concentration levels of the residual liquid waste may be removed, further allowing subsequent rinses to be re-circulated to concentrate the waste water discharge.

Inasmuch as the apparatus is continuous in operation, a controlled discharge rate of liquid-free material (notably plastic container granulates) is obtained at the discharge portion of the apparatus. The material is conveyed to further processing equipment from the discharge port.

DESCRIPTION OF THE PREFERRED EMBODIMENTS

Figure 1:
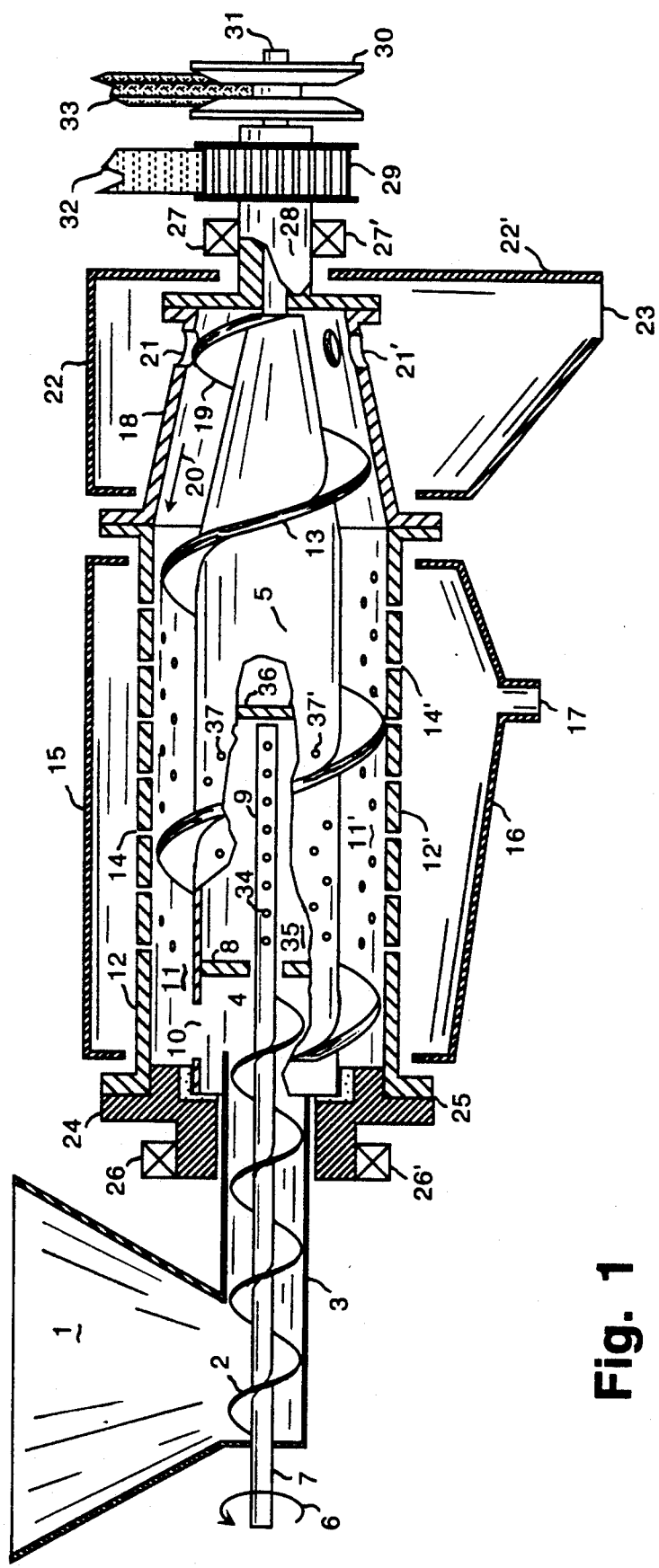
FIG. 1 is a sectional view of the centrifugal apparatus.

To simplify the description, symmetrical parts, or portions of a single part where divided by a sectional view, will be designated with a prime ('). The description of the part(s) having primed reference characters will be limited.

Referring now to FIG. 1, the concept of the preferred embodiment is shown in a sectional assembly view. Granulated container material (generally plastic containers) in the form of chips or shreds which are contaminated with residual liquid waste (usually motor oil) are fed into the receiving hopper 1. A feed auger 2 located at the bottom of the receiving hopper 1, conveys said chips or shreds through the feed auger housing 3 into the conveying auger infeed chamber 4. The feed auger 2 is driven independently of the conveying auger 5 at the location and direction of rotation as indicated by arrow 6. In the preferred embodiment, the feed auger tube 7 protrudes into the conveying auger 5 through the infeed chamber wall 8, extending into the interior of said conveying auger with a spray bar 9 portion. As will be explained later in fuller detail, the low speed feed auger 2 and its stationary auger housing 3 are linked neither mechanically nor rotationally with any high speed portions of the centrifuge apparatus.

Upon entering the conveying auger infeed chamber 4 the granulate is centrifugally flung through the conveying auger feed ports 10 into the conveying portion 11 of said conveying auger between the centrifugal auger 5 proper and the perforated centrifugal auger cylinder 12. The conveying auger flights 13 subsequently carry the granulate the length of the perforated centrifugal auger cylinder 12 by means of the relative rotational difference between said centrifugal auger and said perforated auger cylinder.

During the centrifugal processing, as the granulate is moved the length of the perforated centrifugal auger cylinder 12, the residual liquid waste is stripped from the granulate and exits the perforated centrifugal auger cylinder 12 through a series of bleed holes 14. Said residual liquid waste is slung from the centrifugal auger cylinder 12 and retained by the upper 15 and lower 16 containment housings. The liquid waste is finally drained from the lower containment housing 16 through the lower containment housing drain port 17.

In the preferred embodiment, the final stage of the centrifugal system consists of a frusto-conical portion 18 corresponding to a similarly configured conveying auger flight 19. The frusto-conical portion 18 has no bleed hole provisions so that any remaining residual liquid waste is carried back to the bleed holes 14 of the previous portion as indicated by arrow 20.

At the termination of the process flow, the granulate is forced out of the centrifugal auger discharge ports 21 into the receiving shroud 22 and discharged at 23.

The mounting system for the high speed rotating conveying auger 5 and perforated auger cylinder 12 assembly is as follows. An infeed hub 24 is immovably attached to the perforated auger cylinder 12 at 25. Said hub locates and supports the adjacent centrifugal assembly through the means of the infeed hub carrier bearing 26. A non-restricting opening is centrally located though which the feed auger housing 3 passes. (Other details of the infeed hub will be shown in FIG. 4). The drive end of the conveying auger is located by means of the drive bearing 27 which is mounted to the drive shaft hub 28.

The drive system for the high speed rotating conveying auger 5 and perforated auger cylinder 12 assembly in one embodiment consists of a simple double sheave drive system. A cog drive sheave 29 is directly mounted to the drive shaft hub 28. A variable speed sheave 30 of substantially the same pulley ratio as the drive sheave 29 is mounted to the conveying auger drive shaft 31. Both the perforated cylinder drive belt 32 and the conveying auger drive belt 33 are driven from sheaves on the same motor shaft (not shown). Consequently, the angular velocity difference between the conveying auger 5 and perforated auger cylinder 12 is limited to the setting of the variable speed sheave 30. In such a manner, the feed rate of the granulate through the apparatus may be finely controlled and limited to a desired through-put irrespective of the rotational velocity of the entire assembly.

Figure 2:
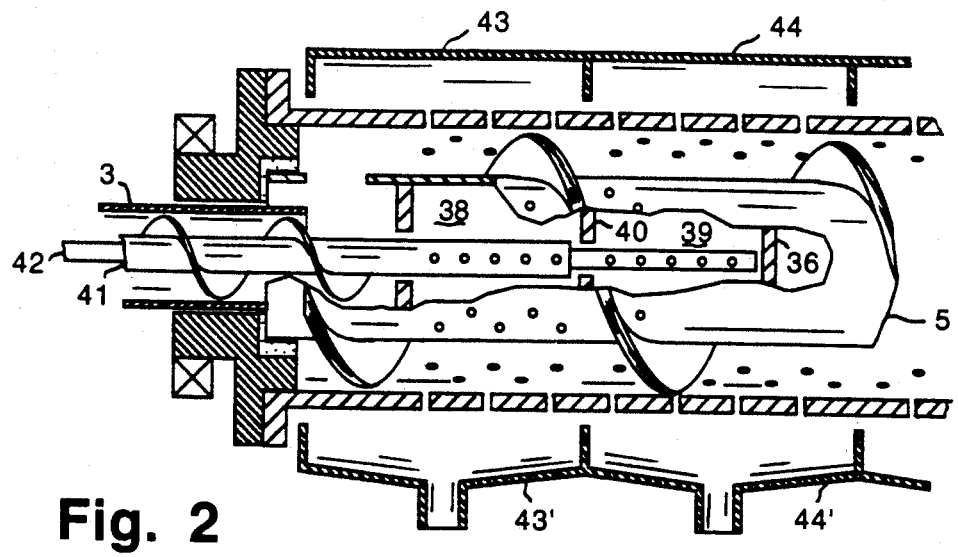
FIG. 2 is a sectional view of a multi-stage configuration of the apparatus.

A final reference to FIG. 1 is pertinent to the provisions which will be seen in FIG. 2. In some cases, a granulate is processed with a residual liquid waste which must be removed with a solvent. (Most notably this is true when soap contaminated detergent containers are processed. In this instance, it is advantageous to rinse the contaminant with water). To achieve a solvent rinse, the feed auger tube 7 is used to convey the solvent (generally water) to the spray bar 9. Solvent thus discharges from the spray bar 9 by way of the spray bar orifices 34 and into a solvent chamber 35 within the conveying auger 5 defined by the infeed chamber wall 8 and a solvent chamber partition 36. Solvent within the solvent chamber 35 is subsequently discharged through the coveying auger solvent holes 37 whereupon it passes through the granulate and is discharged through the bleed holes 14.

FIG. 2 is included to show the detail of a multi-stage solvent rinse system. (In cases where apparatus details are similar to those found in FIG. 1, no reference will be made to such items.) In those instances where a solvent rinse is required, there is great advantage in causing the solution or suspension to become as highly concentrated as possible. This is achieved by providing multi-stage operation. In this case, there is a first solvent chamber 38 and a second solvent chamber 39 separated by a intermediate solvent chamber partition 40. The first solvent chamber 38 is supplied by a solvent flow at 41, whereas the second solvent chamber 39 is supplied by a solvent flow at 42. Solvent and residual liquid waste removal is achieved with a first partitioned containment housing 43, a second partitioned containment housing 44, and the like, as needed.

Figure 3:
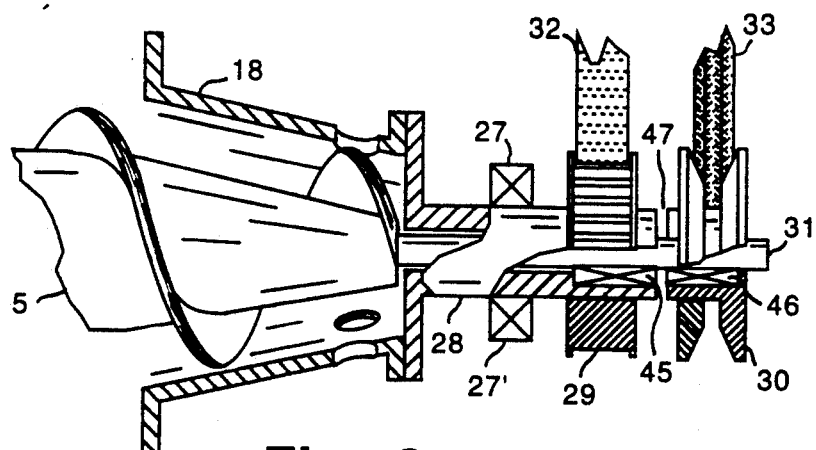
FIG. 3 is a partial section view of an overrun clutch mechanism.

FIG. 3 shows the details of an overrun clutch. A first roller clutch bearing 45 is located between the drive shaft hub 28 and the auger drive shaft 31 so that when the cog drive sheave 29 is driven, the drive shaft 31 is locked and driven at synchronous speed to said drive shaft hub. A second roller clutch bearing 46 is located in the variable speed sheave 30. This second roller clutch bearing 46 will allow the drive shaft 31 to overrun the variable speed sheave 30, but will lock on the drive shaft 31 when said variable speed sheave exceeds the rotational speed of the drive shaft hub 28. When the drive shaft 31 exceeds the rotational speed of the drive shaft hub 28, the first roller clutch bearing 45 will freely allow rotation. Thus, the conveying auger 5 will never lag behind the rotational speed of the centrifugal auger cylinder 12, though said auger may be driven at a rotational speed greater than said auger cylinder. A thrust bearing is located at 47.

Figure 4:
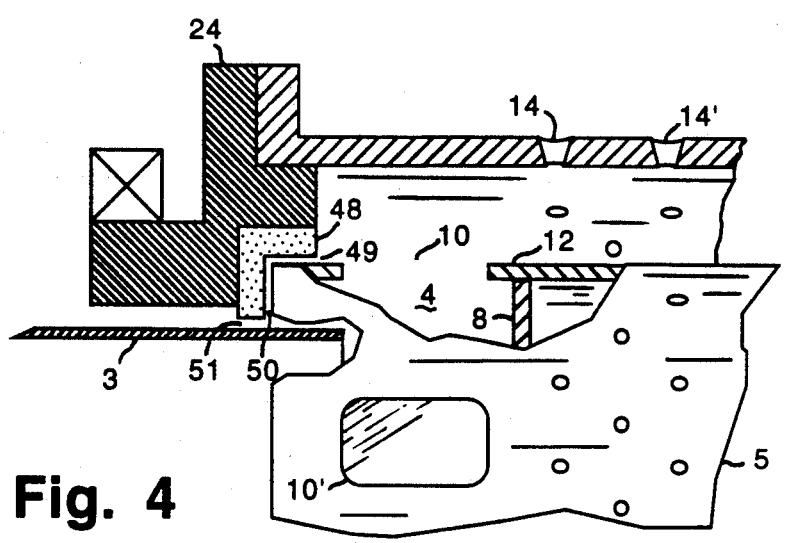
FIG. 4 is a sectional view of the feed end auger support and the perforated cylinder holes.

FIG. 4 shows the details of the infeed hub 24 and adjacent assemblies. A support bushing 48 consisting of a formed, resilient material (generally UHMW) is rigidly mounted to the infeed hub 24 as indicated. In the first case, the support bushing 48 provides the locating means for the conveying auger 5 at 49. Note, however, that the thrust function of the centrifugal auger assembly is at the thrust bearing 47; a non-bearing load gap 50 is maintained between the support bushing 48 and the conveying auger 5. In a second case, the support bushing 48 affords protection from inadvertent contact between the feed auger housing 3 and the infeed hub 24 at 51. Inasmuch as the support bushing 48 is rotating at high angular velocity, and the feed auger housing 3 is stationary, complete absence of contact is desirable. However, should contact momentarily occur, the contact surface is not metal-to-metal.

FIG. 4 further shows the details of the conveying auger feed ports 10 which are circumferentially located on the conveying auger 5. Larger detail of the bleed holes 14 are shown in this drawing which show the preferred configuration as being conical, with the smaller diameter toward the residual waste liquid entrance point. The preferred included angle of the conical wall surfaces of the bleed holes 14 is not less than forty degrees.

OPERATION

During operation, both the feed auger 2 speed and the forward conveying speed of the conveying auger 5 are controlled so that an optimum throughput is obtained. Optimum throughput is established by predetermining the desired thoroughness of residual liquid waste removal for a given time interval. Inasmuch as complete centrifugal removal of the residual liquid waste is neither desirable from the standpoint of economics nor technically possible (that is, with no trace residues), a level of allowable contamination must be established for the finished granulate. The feed auger 2 rotational velocity is adjusted to determine the quantity of material within the process at a given time while the conveying auger 5 rotational velocity (relative to the auger cylinder 12) will determine the dwell time within the process.

In the case of a residual liquid waste product such as motor oil, the solvent rinse system is not used; the objective of the procedure as used with motor oil is to remove the oil uncontaminated with any solvent. A subsequent wash process with other equipment is used to remove the trace oil contaminant from the granulate.

When a solvent rinse is employed, either a single stage, or multi-stage configuration may be used. In a single stage application, the solvent (water, or water and soap mixtures) is injected into the feed auger tube 7 and through the spray bar orifices 34. The control of the solvent material is accomplished by metering valves regulating the solvent flow as it is injected into the feed auger tube 7, since all solvent entering the first solvent chamber 38 immediately disperses through the granulate as the solvent passes through the conveying auger solvent holes 37. The advantage of a solvent rinse during the process is realized in the removal of the soluble liquid contaminant at high concentration levels. This alleviates a low-concentration contamination of subsequent wash cycle solvents (typically water) which must be treated in large volume to remove said contaminant. This is evident with such waste materials as soap (as will be found when reprocessing soap and detergent bottles), wherein a concentrated soap solution can be removed with the rinsing action.

As a further refinement of said solvent rinsing process, multi-stage rinsing may be used. That is, a first light rinse may be used in the first solvent chamber 38 to remove a high concentration of residual liquid waste material, which would be processed in its concentrated form. Subsequent rinses in the second solvent chamber 39 may consist of heavy usage of the rinse solvent (most likely water) being diverted to the main waste water stream. As a further aid to increasing the concentration of the first rinse, the solvent draining from the second (or last in the series) partitioned containment housing 44 may be recirculated as the solvent flow 41 to the first solvent chamber.

The feed auger tube 7 and spray bar 9 extend through the infeed chamber wall 8 without touching said wall or requiring a supporting bearing assembly. It should be obvious that the angular velocity is significantly different between the feed auger tube 7 and the infeed chamber wall 8 (or the intermediate solvent chamber partition 40). It is important, therefore, that said feed auger tube have sufficient rigidity and support from the feed auger assembly that interference is not encountered. It is not important that said openings in said walls maintain a close tolerance fit around the auger tube 7, inasmuch as the radial force within the solvent chamber 35 (or multiple solvent chambers) readily carries the solvent to the inside surface of the conveying auger 5.

It should be noted that the spray bar 9 and corresponding conveying auger solvent holes 37 terminate upstream (viewed in the direction of granulated material movement) from the final series of bleed holes 14 in the perforated centrifugal auger cylinder 12. This aids in the complete removal of the solvent rinse.

The frusto-conical portion 18 of the apparatus, which has no bleed holes, causes any residual liquid to flow toward the bleed holes 14 and away from the centrifugal auger discharge ports 21. In another embodiment, said frusto-conical portion may be replaced with a straight-walled continuation of the perforated centrifugal auger cylinder 12. However, said straight-walled section must not have bleed holes 14 extending within the receiving shroud 22.

A simplified drive system is achieved by powering both drive sheaves (not shown) from the same power shaft. By using a cog cylinder drive belt 32, a non-slip drive is realized for the perforated centrifugal auger cylinder 12. However, the variable speed sheave 30 drive is more prone to slip, especially when oil contaminated materials are being processed. Excessive slipping of the conveying auger drive belt 33 could cause an excessive material throughput. Therefore, a roller clutch drive system has been devised wherein the conveying auger 5 can never rotate at a lower rotational velocity than the conveying auger cylinder 12. Said centrifugal auger can, however, be driven at a rotational velocity greater than that of the auger cylinder 12, thus assuring controlled feed of the granulate material through the process.

Centrifugal testing has been conducted to determine the ideal angular velocity for the apparatus. The tests were done with high density polyethylene (HDPE) oil container material contaminated with 30-weight viscosity motor oil. It was determined that acceptable stripping of the oil from the plastic commences at a centrifugal force proportional to an acceleration of 330 g. It was also determined that performance of the apparatus is improved as the angular velocity is increased. A range of tests were conducted to a centrifugal force upper limit proportional to an acceleration of 1,225 g. (Speed tests higher than this were deemed unadvisable for safety and mechanical considerations.) Required process dwell time will be reduced proportionately as higher radial force is applied.

As shown in FIG. 4, it has been determined that a conical wall of an included angle of forty degrees on the bleed holes 14 reduces the propensity of granulate plugging the holes. Further, the support bushing 48 maintains a clearance at the non-bearing load gap 50; the thrust load is distributed to the thrust bearing 47 between the variable speed sheave 30 and the drive shaft hub 28.

It should also be noted that this apparatus is primarily intended for use with properly granulated or chipped material rather than shredded material. Shredded material will not readily pass through the conveying auger feed ports 10 or discharge ports 21. Further, testing shows that shreds tend to lodge between the auger flights 13 and the inside wall of the auger cylinder 12.

A further advantage of an auger feed through the centrifugal portion of an apparatus as described herein is the continuous reorientation of the plastic or granulate material as it moves through the processing portion of said apparatus. This continuous reorientation prevents said liquid waste material (most notably engine oil) from remaining in pockets within said plastic or granulate material assuring.

It should be obvious that this invention substantially operates as a material drying device when solvents are used which evaporate. It may therefore be employed as a material drying apparatus (separately or in conjunction with a rinse process) when the solvent is water, or as a final drying stage in a series of processing steps.

Of necessity, this apparatus will include a drive consisting of an electric motor or other motive device which is not shown. Said motor drive would be coupled by means of belts to the cog drive sheave 29 and the variable speed sheave 30. In addition, control and timing devices, which are outside the concern of these particular specifications, are also incorporated into the design of this apparatus.

While the present invention has been described in conjunction with two centrifugal embodiments, it is to be understood that various modifications and other embodiments of the present invention may be made without departing from the scope of the invention as described herein and as claimed in the appended claims.

The embodiments of the invention in which an exclusive property or privilege is claimed are defined below.

What I claim is:

1. A method of continuous centrifugal removal of residual liquid waste from recyclable granulated container material wherein a continuous centrifugal apparatus separates said recyclable granulated container material from said residual liquid waste, said method comprising:
   a) filling a perforated centrifugal auger cylinder assembly with said recyclable granulated container material which is co-mingled with said residual liquid waste;
   b) rotating said perforated centrifugal auger cylinder assembly at sufficient angular velocity to strip said residual liquid waste from said recyclable granulated container material;
   c) rotatably driving a conveying auger located within said perforated centrifugal auger cylinder assembly independently of said perforated centrifugal auger cylinder assembly so that the rate of travel of said recyclable granulated container material through said perforated centrifugal auger cylinder assembly proceeds at a predetermined rate; and,
   d) radially arranging a series of bleed holes on the exterior portion of said perforated centrifugal auger cylinder assembly whereby said residual liquid waste is transported from a conveying portion of said continuous centrifugal apparatus to a liquid waste containment housing.

2. A method as defined in claim 1 wherein said provision of radially arranging a series of bleed holes on the exterior portion of said perforated centrifugal auger cylinder assembly includes conically configuring said bleed holes with the largest diameter of said bleed holes at the locale most distant from the axis of rotation.

3. A method as defined in claim 1 wherein a discharge portion for said perforated centrifugal auger cylinder assembly is provided at a location where said recyclable granulated container material is expelled by said conveying auger acting in unison with a centrifugal force generated by the angular velocity of said continuous centrifugal apparatus.

4. A method as defined in claim 1 wherein a frustoconical portion of said perforated centrifugal auger cylinder assembly directs said residual liquid waste contaminants away from said discharge portion of said perforated centrifugal auger assembly.

5. A method as defined in claim 1 wherein a feed auger delivers recyclable granulated container material to an infeed chamber within said perforated centrifugal auger cylinder assembly through an arrangement of auger feed ports.

6. A method as defined in claim 1 wherein a series of radially positioned solvent holes communicate between the centrifugal auger solvent chamber and said perforated centrifugal auger cylinder assembly whereby a solvent may pass from within said centrifugal auger solvent chamber into said recyclable granulated container material.

7. A method as defined in claim 1 wherein a feed auger tube, or multiple concentric feed auger tubes, convey a solvent into said centrifugal auger solvent chamber.

8. A method as defined in claim 1 wherein multiple and isolated liquid waste containment housings which operate in unison with said feed auger tube concentrate said residual liquid waste material carried by said solvent.

9. A method as defined in claim 1 wherein a drive system consisting of a first belted drive to the drive shaft hub of said perforated centrifugal auger cylinder assembly and a second belted drive to the conveying auger drive shaft determines the rotational speed of said perforated centrifugal auger cylinder assembly relative to said conveying auger.

10. A method as defined in claim 1 wherein a direct drive linkage to said perforated centrifugal auger cylinder assembly and a variable drive linkage to said conveying auger establishes the speed of said centrifugal conveying auger at a slightly lesser or slightly greater rotational speed relative to said perforated centrifugal auger cylinder assembly.

11. A method as defined in claim 1 wherein said drive system consists of a first roller clutch bearing in a drive shaft hub and a second roller clutch bearing in a second belted drive sheave which prevents the speed of rotation of said centrifugal auger cylinder from exceeding the speed of rotation of said centrifugal auger.

12. A method as defined in claim 1 wherein said recyclable granulated container material is continuously reoriented by the tumbling action induced by said conveying auger acting in cooperation with said perforated centrifugal auger cylinder assembly so that all surfaces of said recyclable granulated container material are stripped of said liquid waste material.

* * * * *